May 15, 1962
N. E. CHASEK
3,035,258
PULSE CODE MODULATION ENCODER
Filed Nov. 14, 1960
5 Sheets-Sheet 1

INVENTOR
N. E. CHASEK
BY
Sylvan Sherman
ATTORNEY

May 15, 1962 N. E. CHASEK 3,035,258

PULSE CODE MODULATION ENCODER

Filed Nov. 14, 1960

5 Sheets-Sheet 2

INVENTOR
N. E. CHASEK
BY
Sylvan Sherman
ATTORNEY

INVENTOR
N. E. CHASEK
BY
Sylvan Sherman
ATTORNEY

INVENTOR
N. E. CHASEK
BY
Sylvan Sherman
ATTORNEY

INVENTOR
N. E. CHASEK
BY Sylvan Sherman
ATTORNEY 3,035,258

PULSE CODE MODULATION ENCODER

Norman E. Chasek, Colts Neck, N.J., assignor to Bell Telephone Laboratories, Incorporated, New York, N.Y., a corporation of New York Filed Nov. 14, 1960, Ser. No. 68,876
15 Claims. (Cl. 340—347)

This invention relates to communication systems employing pulse code modulation and in particular to accurate high speed, linear encoders for use in such systems.

In communication systems utilizing what is known as pulse code transmission, the signal to be transmitted is sampled periodically to ascertain its instantaneous amplitude. The measured instantaneous amplitude is expressed by means of a series of pulses which are themselves transmitted in lieu of the actual signal.

One possible code which may be employed in pulse code transmission involves permutations of a fixed number of code elements each of which may have any one of several possible conditions or values. A popularly utilized code of this type is the so-called binary code in which each code element or digit has either of two values or states. One possible way of representing these states is to represent one of them by means of a pulse of current or voltage, sometimes referred to as an "on pulse" and the other by the absence of such a pulse, referred to as the "off pulse." Alternately, one state may be represented by a positive pulse and the other state by a negative pulse.

Because the total number of different amplitudes is limited to $2^n$, where $n$ is the number of code elements employed, the instantaneous measured amplitude of the signal can only be approximated. This is done by quantizing or dividing the continuous range of amplitudes of which the signal is capable into a fixed number of constituent ranges or limits within which the signal amplitude may fall. Each of these ranges or limits may then be treated as if it were a single amplitude and represented by one of the possible permutations of the code.

It is the function of the encoder to convert the signal into the pulse code and includes the steps of sampling, quantizing, encoding (converting to binary code) and timing, though not necessarily in the indicated order.

The ideal encoder is capable of encoding the signal at a rate commensurate with the signal bandwidth, is accurate in its evaluation of the signal amplitude, is capable of preserving the signal waveform during the manipulation of the signal, requires little maintenance and is simple in its physical structure.

Prior art encoders tend to be deficient in one or more of the above-noted characteristics.

For example, prior art encoders commonly in use can be characterized as "level-at-a-time encoders," "digit-at-a-time encoders" or "word-at-a-time encoder." (See "Transmission Systems For Communications" published by the Bell Telephone Laboratories, chapter 26.) In the level-at-a-time encoder, the value of each possible code combination is compared in turn with the signal. This, however, is a slow process since time must be allowed for one comparison for each of the $2^n$ possible levels in an $n$ digit system. Consequently, the use of this method of encoding is of necessity, confined to relatively low speed systems.

The digit-at-a-time encoder may be viewed as a geometric progression in which it is first determined in which half of the entire group of possible codes the signal should be placed, then in which quarter of the selected half; next the eighth of the selected quarter is determined, and so on. The process is carried on until the location is specified to the desired degree of fineness. Digit-at-a-time encoders need only make $n$ decisions, as against the $2^n$ (maximum) required in the level-at-a-time type.

Typical of the digit-at-a-time encoders are the so-called "recycling encoder" and the "network encoder." Both of these belong to the general class of "sequential-comparison encoders" in which the signal to be encoded is recirculated through the same device or related devices until each of the $n$ code digits is generated. Because of this reuse of the same encoding device or the interdependency of these devices, there is an inherent speed limitation imposed upon this type of converter.

True high speed operation is obtained in the "word-at-a-time converter" since in this type device only one question need be asked; i.e., what word (code combination) does this signal level represent? In order to answer this question, however, all possible code combinations must be stored internally in the coder and the one that most closely approximates the analog signal selected. Typical of such devices are the beam coding vacuum tubes, or so-called "flash encoders." (See United States Patent 2,616,060, issued October 28, 1952 to W. M. Goodall.) As explained in the above-mentioned patent, the "word-at-a-time converter" is essentially a cathode ray tube with all the limitations inherent in such devices, such as large size, need for precision in manufacture, need for careful handling and the need for associated circuits to operate it. Perhaps the most important limitation on the use of such devices for highly linear applications is the high level (100 volt) linear amplifier needed to drive the deflection circuits of the tube.

It is, therefore, the general object of this invention to encode high speed signals.

It is a more specific object of this invention that the encoder be small, simply constructed and have a high degree of accuracy and linearity in its operation.

In accordance with the invention these objectives are realized by providing a separate and independent encoder circuit for each digit in the binary code. Specifically, each of the encoder circuits comprises a full wave rectifier, a sensing circuit for determining the instantaneous polarity of the signal and a sampling network for sampling the signal polarity at a suitable rate.

The sensing circuit consists of an oscillator whose frequency is controlled by the state of conduction of one of the rectifier elements in the full wave rectifier. As the signal polarity reverses, the monitored rectifier goes from conduction to non-conduction or vice versa. This results in an abrupt change in the oscillator frequency, which change is then detected in a frequency discriminator.

The individual encoders, also referred to as code digit generators, generate separate code digits (marks or spaces) which, in turn, are sequentially arranged in time to form the desired code group by means of suitable delay networks.

Interconnecting the several full wave rectifiers are a plurality of highly linear amplifiers which, by the appropriate proportioning of components also perform the quantizing function.

As indicated above, the accuracy of an encoder determines to what extent the encoded signal is a true representation of the original signal. The accuracy also determines how closely the quantizing noise approaches the theoretical limit.

It is expected that future PCM systems for Bell System use will require up to nine code digits, or better than 0.1 percent accuracy. While the use of a full wave rectifier, in accordance with the principles of the invention, in which the state of conduction in one of the rectifying elements is used to determine the code digit, produces good accuracy, considerably greater accuracy is obtained by having that rectifying element control the frequency of a variable frequency oscillator. With such an arrangement, the region of transition between a mark or a space (an "on" pulse or an "off" pulse), corresponding to the transition from conduction to non-conduction, is further amplified and, hence, ascertained with greater accuracy, by the action of the frequency discriminator.

Accuracy is further improved by the use of the so-called "Gray" code, which is inherent in the encoder (see United States Patent 2,632,058 issued on March 17, 1953 to F. Gray). The use of the Gray code sets the limit of maximum over-all accuracy and stability of the slicing and biasing circuits of each digit element to half the least significant digit. Deviations from this maximum limit only affect the least significant digits and, as such, Gray code encoders are unlike other types of sequential coders wherein gross errors can be produced for similar deviations.

Encoder linearity, a second important consideration, is related to encoder accuracy. If the signal waveform is not maintained and faithfully reproduced as it progresses through the encoder, the greatest of accuracy in encoding will not reproduce the original signal. In accordance with the invention, the required degree of linearity is obtained by the use of low gain transistor amplifiers operated and adjusted in the manner set forth in my copending application Serial No. 33,459 filed June 2, 1960.

It is a feature of the invention that for a given bandwidth signal, the bandwidth of the individual code digit generators can be substantially less than most prior art sequential encoders which require that all the code digits be generated before the next signal point can be sampled.

It is a further feature of the invention that the encoder has a high degree of flexibility allowing for changes in the code rate and sampling rate without requiring changes in the code digit generator circuits.

These and other objects and advantages, the nature of the present invention, and its various features, will appear more fully upon consideration of the various illustrative embodiments now to be described in detail in connection with the accompanying drawings, in which.

Figure 1:
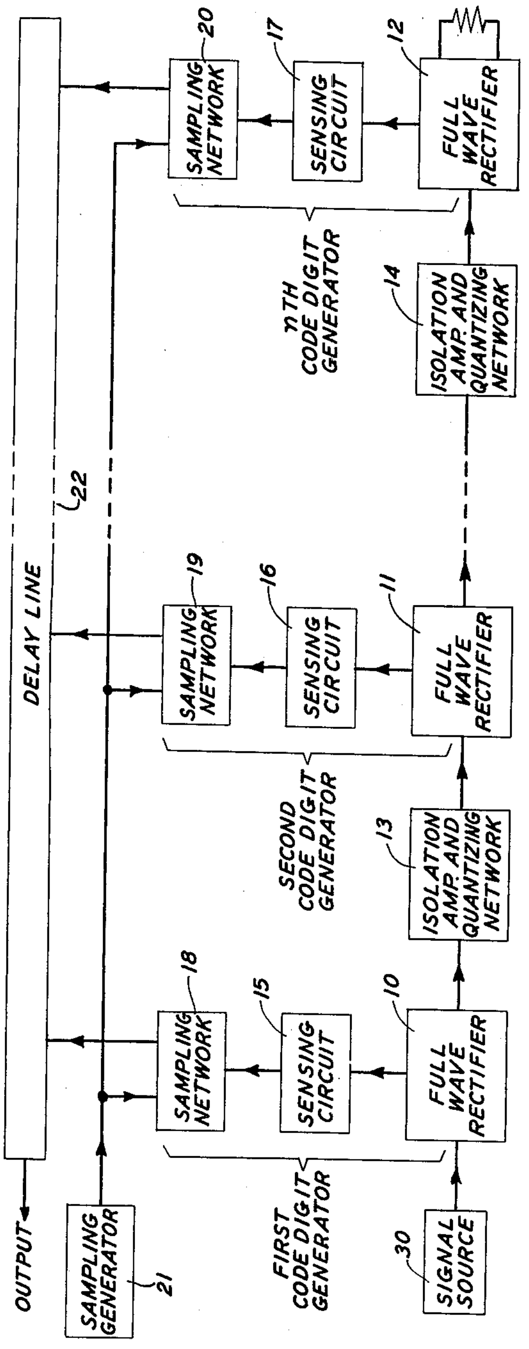
FIG. 1 illustrates by block diagram an encoder in accordance with the invention.

Referring more specifically to FIG. 1, there is shown, in block diagram, an encoder in accordance with the invention. Essentially, the encoder comprises a plurality of $n$ cascaded full wave rectifiers, i.e., one for each code digit. Shown in FIG. 1 are the first two rectifiers 10, 11 and the $n^{th}$ rectifier 12, interconnected by means of isolation amplifier and quantizing networks 13 and 14. Also connected to each of the rectifier units, such as is shown connected to units 10, 11 and 12, are the several sensing circuits 15, 16 and 17 which provide a continuous and instantaneous monitoring of the polarity of the signal applied to the respective rectifiers. The output of each sensing circuit is, in turn, sampled at a predetermined rate determined by the sampling generator 21, in one of the respective sampling networks 18, 19 or

20. These networks are coincidence circuits that transmit at intervals determined by generator 21. The outputs from the sampling networks consist of a plurality of code digits which define the amplitude of the input wave at any given instant. This essentially simultaneous array of code digits is converted to a sequential array by successively delaying the several digits with respect to each other by means of a delay line 22.

It is the function of each full wave rectifier and sensing circuit combination to determine the instantaneous polarity of the signal applied thereto and to convert this information into a binary type signal. Specifically each rectifier-sensing circuit decides whether the signal amplitude is greater than or less than zero. These two possible states may be indicated in any number of ways, as, for example, by variations in frequency or amplitude of a sensing signal. In the illustrative embodiment of the invention shown in FIG. 1, the amplitude of a discriminator output is utilized to designate the instantaneous polarity of the input signal.

In operation, the signal to be encoded, derived from a signal source 30, is applied to the input of the first full wave rectifier 10. This signal, shown as curve 31 in FIG. 2, may assume any complex form representative of the waveforms encountered in speech, music, sound, mechanical vibrations, picture transmission, et cetera. The only limitation upon the applied signal is that the maximum positive and the maximum negative excursions be less than some predetermined level indicated as +I and −I. For purposes of illustration, the waveform of the input signal 31 applied to rectifier 10 is a sine wave of decreasing amplitude whose maximum absolute amplitude is less than I.

Figure 2:
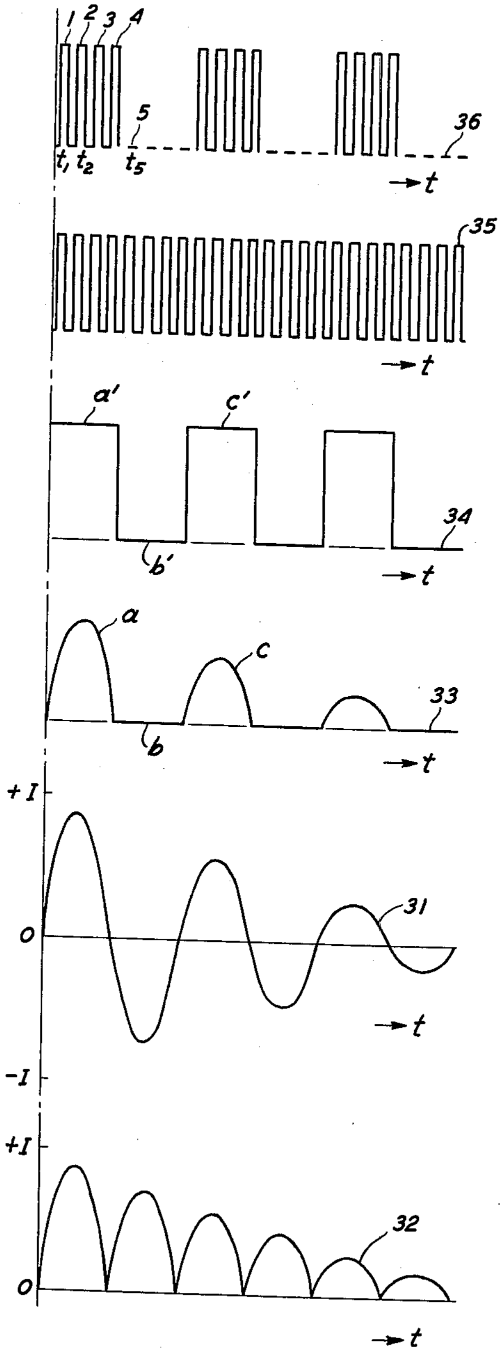
FIGS. 2 and 3 show typical waveforms at various points in the encoder.

Referring to FIG. 2, one of the output waveforms obtained from rectifier 10 is the unidirectional varying signal 32, typical of the output of a full wave rectifier. For the particular input signal 31, output signal 32 comprises a succession of unidirectional half sine waves of decreasing amplitude.

A second output waveform derived from rectifier 10 is obtained by sampling one of the rectifying elements of rectifier 10 to determine whether it is in a conducting or a non-conducting state. Obviously the sampled rectifying element may be one which conducts either during the negative excursions of the input signal or during the positive excursions of the input signal. Whichever is chosen, however, the choice must be consistently followed in each of the succeeding rectifier units.

In the illustrative embodiments of FIG. 1, a rectifying element which conducts during the positive excursions of the input signal is sampled to produce the waveform 33. Thus, for example, during the first positive half cycle of the input signal 31, the sampled rectifier element is conducting and produces the output designated $a$ on waveform 33. During the following negative half cycle of the input signal 31, the sampled rectifier element is in a non-conducting state and produces the output designated $b$ on waveform 33. During the next positive half cycle of the input signal 31, the rectifier element is again conductive to produce the output designated $c$ on waveform 33, et cetera.

In general, the second waveform derived from the rectifier circuits and applied to the sensing circuits is a half wave rectified signal which, during the conducting period, varies in amplitude in accordance with the variations of the input signal. Accordingly, the instantaneous amplitude of waveform 33 varies along the intervals $a$ and $b$. However, since the only property of interest is the fact of conduction or non-conduction, these variations need not be preserved in the sensing circuit. Thus, the output of the sensing circuit is a succession of pulses 34 of uniform amplitude which correspond to the succession of pulses comprising waveform 33. For example, the "on" pulses $a^1$ and $c^1$ of wave 34 correspond to the "on" pulses $a$ and $c$ of wave 33, while the "off" portion designated $b^1$ corresponds to the "off" period $b$ of wave 33. It will be noted that pulses $a^1$ and $c^1$ are substantially equal in magnitude in contrast to the amplitudes of pulses $a$ and $c$ which tend to follow variations in the input signal.

The output of the sensing circuit, comprising waveform 34, constitutes a continuous monitoring of the polartiy of waveform 31. This information is, in turn, converted into first binary code digit by means of the sampling generator 21 and sampling network 18. The latter is essentially a coincidence circuit which passes portions of waveform 34 at such intervals as are determined by the sampling generator 21. As is well known in the art, if a band-limited signal is sampled at regular intervals at a rate which is twice the highest significant signal frequency, the samples contain all of the information of the original signal. Thus, if the bandwidth of the signal source 30 is limited to an upper frequency $f_s$, the repetition rate of the sampling generator is fixed at $2f_s$.

The output of generator 21 is shown in FIG. 2 as waveform 35 and comprises a plurality of narrow, uniform pulses having a repetition rate $2f_s$. These are applied to the sampling network 18 along with the output waveform 34 from the sensing circuit 15. The output from the sampling network, waveform 36, is the product of waveforms 34 and 35, and consists of an array of time pulses and spaces. It is important to note at this time that these pulses and spaces are not a binary code but merely the time variations of a single digit of such a code. Thus, at time $t_1$, the code digit generated by rectifier 10 and its above-described associated circuits is a pulse 1. Similarly, at a later time $t_2$, the code digit generated is a pulse 2. These pulses, and the subsequent two pulses 3 and 4 indicate that the applied signal 31 is greater than zero during the designated time intervals. At time $t_5$, however, the code digit is a space 5, indicating that during time interval $t_5$, the signal 31 has an amplitude less than zero.

Having generated the first code digit, the signal in the form of the full wave rectified wave 32, is applied to the full wave rectifier 11 of the second code digit generator by means of the isolation amplifier and quantizing network 13. It is the function of the latter, as the name implies, to first electrically isolate the two adjacent rectifier units 10 and 11, and in addition, to prepare the signal for the second decision. It will be recalled that the first code digit indicates whether the signal amplitude is less or greater than zero. The second code digit tells whether the signal is less or greater than half its maximum permissible value of I. To make this determination, the zero reference level of the rectified signal, depicted by waveform 32, is shifted from its prior position midway between +I and −I to a point midway between +I and zero, or to a point $I/2$. Waveform 32, so shifted is shown as curve 40 in FIG. 3, and constitutes the output signal from the isolation amplifier and quantizing network 13. This signal is applied to the second full wave rectifier 11 which operates on signal 40 in the usual manner to produce the full wave rectified wave 41. In addition, waveform 42 is generated across one of the rectifier elements. Waveform 42 has "off" periods corresponding to those periods of time during which signal 40 goes negative, and "on" periods corresponding to those periods of time during which signal 40 is greater than zero. Signal 42 is applied to the sensing circuit 16 whose output comprises the succession of pulses 43 of uniform amplitude and whose time duration corresponds to the time duration of the pulse of waveform 42.

The importance of the sensing circuits becomes apparent when waveforms 42 and 43 are compared. Whereas some of the pulses of waveform 42 are very small, the pulses of waveform 43 all have a uniformly large amplitude, thus minimizing the possibility of errors. The manner in which the sensing circuit converts the rectifier output signal to an array of uniform pulses will be explained in greater detail hereinbelow.

The output from sensing circuit 16 is applied to sampling network 19 along with the sampling signal 44 obtained from sampling generator 21, to produce the waveform 45. The pulses and spaces comprising waveform 45 constitute the time variations of the second binary code digit. That is, at time $t_1$, the second code digit in the $n$ digit binary code defining the amplitude of signal 31 is the space 1. At a later time $t_2$, the second code digit is the pulse 2, et cetera.

The above-described process is repeated $n$ times to generate the $n$ code digits of the binary code. Each of the remaining code digit generators is essentially the same as the first two described above. However, the several isolation amplifier and quantizing networks may differ in at least two respects. As noted above, quantizing requires that the zero level of the output signal from each of the rectifier units be shifted. The zero reference for signal 31 is midway between +I and −I. For signal 32, the zero reference level is shifted to a point $I/2$. For signal 41, the zero reference level will be shifted to a point $I/4$. In general, the zero reference level of the rectified signal from the $m^{th}$ rectifier is shifted to a point $I/2^m$.

The second difference among the several isolation amplifiers relates to the gain of these units. As the signal is repeatedly rectified and quantized, it experiences a reduction in amplitude. To offset this effect, the gain of the isolation amplifier is raised, thus maintaining a convenient working signal level throughout. This gain or loss experienced by the signal changes the above-indicated zero reference levels by a proportional amount. Hence, more accurately, the zero reference level is shifted to a point $$\frac{IG}{2^m}$$

where G is the total net gain in the circuit up to the $m^{th}$ amplifier.

Having described the over-all operation of the encoder in accordance with the invention, a more detailed description is now given of some of the individual units referred to above. Where possible, corresponding reference numerals are used to facilitate identifying the various circuit functions.

Figure 4:
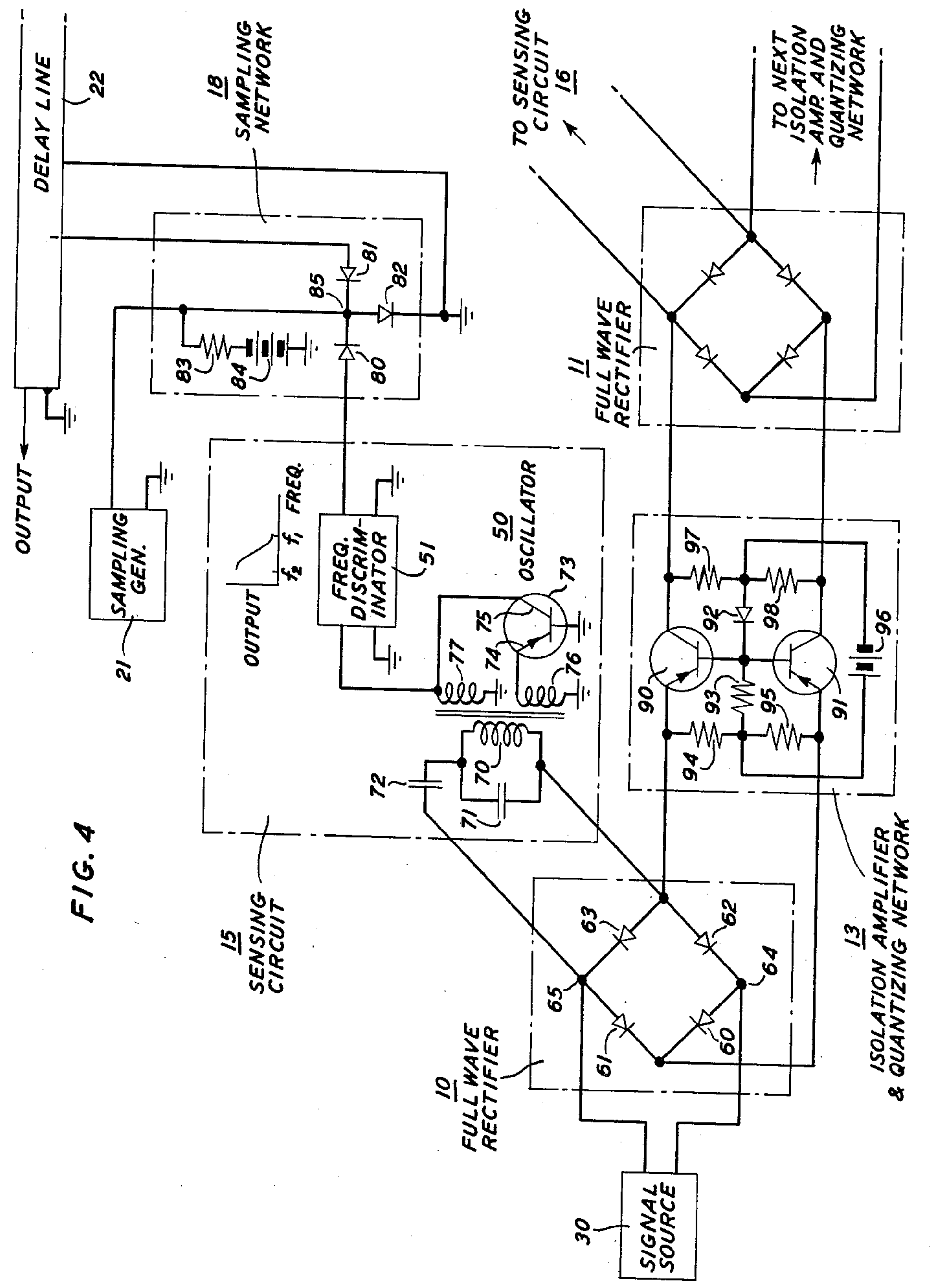
FIG. 4 shows schematically various elements of the encoder of FIG. 1.

Referring to FIG. 4 there is shown, in some detail the first code digit generator comprising full wave rectifier 10, sensing circuit 15 (which includes oscillator 50 and frequency discriminator 51), sampling network 18, and sampling generator 21.

Signal source 30, shown in block diagram form, may be any signal that is to be encoded prior to transmission. The signal, whence derived, is applied to the full wave rectifier 10 comprising the four rectifying elements 60, 61, 62 and 63 in a full wave bridge configuration. When the polarity of the applied signal is such that junction 64 is negative with respect to junction 65, the rectifying element 63 is biased in the reverse or high resistance direction. When the polarity of the applied signal is such that junction 64 is positive with respect to junction 65, rectifying element 63 is biased in the forward or low resistance direction. Thus, rectifying element 63 senses the polarity of the applied signal and indicates its determination by presenting either a high or low impedance across its terminals.

Connected across element 63 is the tank circuit of oscillator 50 comprising inductor 70, and capacitors 71 and 72. Oscillator 50 may be any type well known in the art. As shown in FIG. 4, oscillator 50 utilizes a transistor 73 connected in the common base configuration. Emitter electrode 74 and collector electrode 75 are mutually coupled to inductor 70 by means of inductor 76 and 77, respectively. By proper choice of the circuit parameters, the feedback energy coupled between the collector circuit and the emitter circuit is of a proper phase and amplitude to overcome circuit losses and sustain oscillations at a frequency determined essentially by the tank circuit. The latter exists in two substantially different states. Thus, for example, during the period when rectifier 63 conducts, the impedance in series with capacitor 72 is relatively low and the frequency of oscillations is a function of both capacitor 71 and capacitor 72. However, when element 63 is cut off, the series branch including capacitor 72 is essentially open circuited. Under this condition the frequency of oscillations is a function of capacitor 71 alone and, accordingly, is substantially different for the two conduction states of rectifying element 63.

The characteristics of the rectifier elements are preferably selected to produce a rapid transition from the non-conducting, high impedance state to the conducting, low impedance state. As a result, oscillator 50 oscillates substantially at one of two different frequencies.

Changes in frequency induced by changes in the state of conduction of element 63 (corresponding to changes in polarity of the signal) are detected by frequency discriminator 51 which may be one of any of the well-known frequency discriminator circuits in common use and has the typical output characteristic shown in FIG. 4. With rectifier 63 biased in the reverse direction, capacitor 72 is effectively out of the tank circuit so that the frequency at which oscillator 50 oscillates is a maximum corresponding to point $f_1$ of the discriminator output characteristic. As the signal goes slightly positive causing rectifier 63 to conduct, its impedance decreases substantially and capacitor 72 tends to lower the oscillator frequency. This is accompanied by a substantial increase in the output from the frequency discriminator. At maximum conduction of rectifier 63, the oscillator frequency is $f_2$ and the discriminator output is a maximum. By a suitable choice of circuit parameters, the slope of the discriminator output curve can be made extremely steep so that the slightest change in frequency produces a relatively large output. A steep slope also produces sharp pulses as the frequency of oscillation changes from $f_1$ to $f_2$ in response to changes in the state of conduction of rectifier 63. This is one of the properties of the invention which imparts the high degree of accuracy to the encoder.

The output from the sensing circuit is applied to the sampling network 18 which is a modified Lewis switch (see W. D. Lewis, United States Patent 2,535,303, issued December 26, 1950). The network comprises the three diodes 80, 81 and 82, resistor 83 and a constant voltage biasing source 84. The diodes are connected in a T-configuration in which diodes 80 and 81 have like electrodes connected to the common junction 85 whereas diode 82 has the other of its electrodes connected to said junction.

With the diodes so connected, the polarity of the bias voltage is such that in the absence of any signals diode 82 is conducting whereas diodes 80 and 81 are cut off. With diode 82 in a low impedance state and diodes 80 and 81 in a high impedance state, the network produces a large attenuation to any signal flow from the frequency discriminator to the delay line 22.

Also connected to the sampling network is the sampling generator 21 whose output, comprising a continuous train of pulses at the sampling rate, is applied to the common junction 85. The amplitude and polarity of the sampling pulse is adjusted to be sufficiently large to overcome the fixed bias produced by bias source 84 thereby reversing the voltage polarity across each of the diodes. With the application of the sampling pulses, diode 82 is cut off and assumes a high impedance state whereas diodes 80 and 81, being forward biased, conduct and assume a low impedance state. The sampling network under these conditions presents a low attenuation to signal flow from the discriminator to the delay line 22. While described in some detail, the particular sampling network herein described is merely illustrative of the many such circuits which may be used equally well in an encoder constructed in accordance with the invention.

The output from the sampling network is applied to the delay line 22 and along with the output from each of the succeeding digit encoders constitute the binary code signal.

The full wave rectified signal from rectifier 10 is coupled to rectifier 11 by means of the isolation amplifier and quantizing network 13. As indicated above and as its name implies, it is the function of this unit to isolate adjacent rectifier units, and to quantize the signal. Quantizing in this instance, relates to the establishment of the proper zero reference level for the rectifier signal prior to its application to the next succeeding digit encoder. Having determined whether the original signal was positive or negative, it is next to be determined whether the signal amplitude is less than or greater than one-half the given predetermined level, I.

The amplifier-quantizer 13 shown in FIG. 4 comprises the two transistors 90 and 91 connected in a push-pull configuration. Resistors 93, 94 and 95 are proportional to bias the two transistors in the manner to be explained hereinbelow. Bias potential is derived from a source of constant potential 96 through diode 92. Two load resistors 97 and 98 are serially connected between the collectors of transistors 90 and 91.

Figure 3:
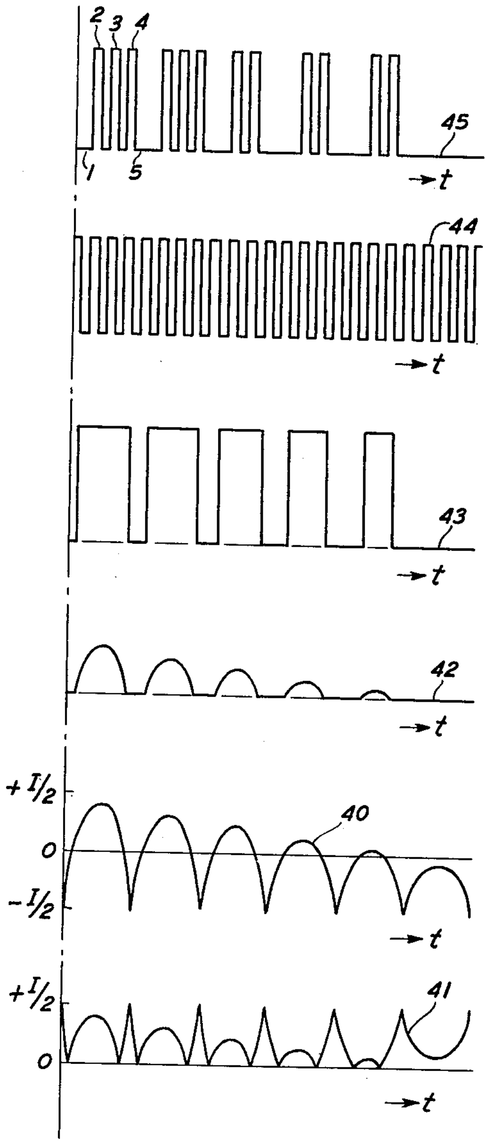

In the earlier discussion with reference to FIGS. 1, 2 and 3, it was explained that the signal derived from signal source 30 was amplitude limited between +I and −I and, accordingly, the reference level of the signal to be applied to the second rectifier unit is $I/2$. In accordance with this requirement, the bias current, $I_2$, in transistor 91 and the bias current, $I_1$, in transistor 90 are adjusted so that their difference is equal to $2(I/2)$. So adjusted, the current from the quantizing network 13 to rectifier unit 11 is zero when the signal applied to the quantizing network is $I/2$. In general, the difference between the currents in the two transistors of the $m^{th}$ amplifier-quantizer is adjusted to be proportional to $$(2I/2^m) \text{ or } \frac{I}{2^{m-1}}$$

The gain of the isolation amplifier is of the order of one, being raised, where necessary, in subsequent units to maintain a convenient signal level. Taking into account the circuit losses and amplifier gain, the difference current in the two transistors of the $m^{th}$ amplifier-quantizer is given by $$\frac{IG}{2^{m-1}}$$

where G is the total net gain in the circuit up to the $m^{th}$ isolation amplifier.

High linearity is obtained by proportioning the amplifier circuit parameters in accordance with the teachings of my above-mentioned copending application. This may require the addition of emitter resistors (not shown).

If vacuum tube amplifiers are used, a corresponding adjustment is made with respect to the grid to cathode voltages.

Figure 5:
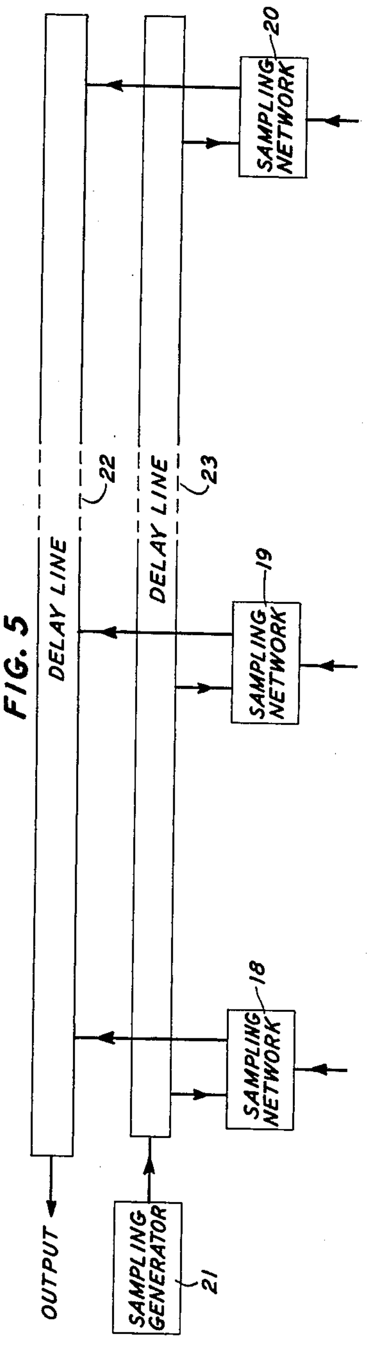
FIG. 5 shows by block diagram a modification of the encoder of FIG. 1.

In the description of the encoder given above, it was assumed that any delay experienced by the signal propagating along the rectifier-amplifier chain was negligible. In accordance with this supposition, the input to each of the sampling networks at any given instant was assumed to correspond to the same point on the signal waveform. Accordingly, the sampling pulses derived from the sampling generator were likewise simultaneously applied to each of the sampling networks. If, however, the delay in each rectifier-amplifier combination is of significance, the effect thereof can be taken into account and corrected for by delaying, by an equal amount, the sampling pulses applied to the various sampling networks. This would require that a second delay line be added to the encoder. As shown in FIG. 5, the output from sampling generator 21 is applied to a delay line 23 which, in turn, connects to sampling networks 18, 19 and 20 at appropriate intervals.

With the sampling pulses suitably delayed, the code digits derived from the sampling networks are, more accurately, a representation of the amplitude of the original signal waveform at any given instant. The code digits thus derived, however, have an initial time displacement with respect to each other which is further increased in delay line 22 to form the desired code group.

A second practical consideration relates to the effect upon the bandwidth of the signal as a consequence of repeated rectification. It becomes readily apparent from an examination of curves 31 and 32 of FIG. 2 and curve 41 of FIG. 3, that the bandwidth of the signal is rapidly increasing and will continue to increase as it progresses through the encoder. This increase, if permitted, would place severe bandwidth requirements upon subsequent rectifiers and isolation amplifiers.

Figure 6:
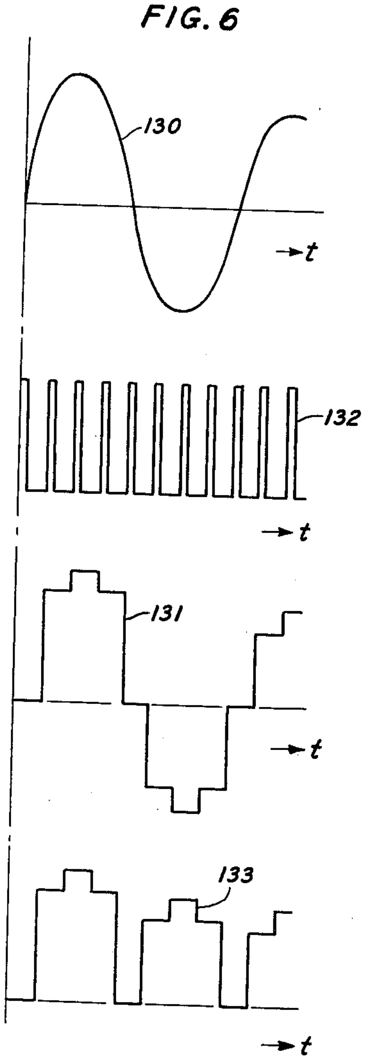
FIG. 6 shows variations produced in the waveforms of FIG. 2 by the inclusion of a sample and hold circuit in the encoder of FIG. 1.

To avoid these extreme bandwidths, the original signal, prior to encoding, is passed through a sample-and-hold circuit which may be of the type described in a copending application by F. K. Becker Serial No. 20,751, filed April 7, 1960. The function of the sample-and-hold circuit is to convert the original signal from a smoothly varying waveform 130, as shown in FIG. 6, to a stepped function 131. The latter waveform is derived by sampling the original signal 130 at the sampling rate. (As determined by the output waveform 132 produced by the sampling generator) and maintaining the amplitude of the signal constant during the interval between sampling pulses.

A typical sample-and-hold circuit includes a storage element, such as a capacitor or an inductor, which is intermittently connected to the signal source at the sampling rate. The circuit time constant is adjusted so that the storage device assumes a state proportional to the amplitude of the signal during the charging interval determined by the width of the sampling pulse. At the end of the pulse, the circuit assumes a second time constant, much longer than the charging time constant, so as to maintain its assumed state of charge or current. The output from the sample-and-hold circuit between samplings is, therefore, constant and proportional to the sampled instantaneous signal amplitude.

The advantage of utilizing such a device is apparent when curve 133 is examined. This latter curve, produced by full wave rectifying curve 131, consists of pulses of varying height having a frequency content no greater than that of the sampling pulses. Furthermore, subsequent rectification, in accordance with the teachings of this invention, will not increase this bandwidth.

Figure 7:
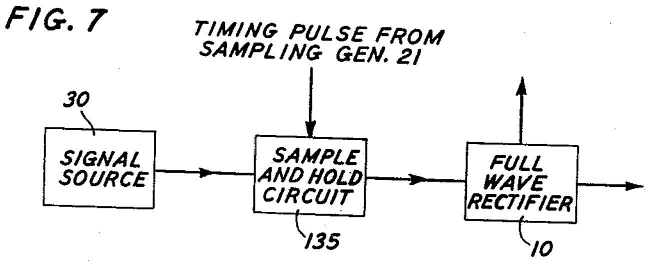
FIG. 7 shows by block diagram a portion of the encoder of FIG. 1 modified to include a sample and hold circuit.

In a typical installation, the sample-and-hold circuit 135, shown in FIG. 7, is interposed between the signal source 30 and the first full wave rectifier 10. In addition to the signal, sampling pulses, derived from the sampling generator 21, (or from another source synchronized with the sampling generator) are applied to the sample-and-hold circuit and function in the manner explained hereinabove.

The encoded signal, generated in an encoder designed in accordance with the principles of the invention is, as explained above, in the Gray code. If the system in which such an encoder is to be used permits, the signal thus generated may be transmitted in the Gray code and, with the use of suitable decoding equipment at the receiving terminal, decoded to recover the original signal waveform. However, if the encoder is to be used in an existing system having receiving equipment designed to decode the normal binary code, it may be more feasible to convert the Gray code signal to the normal binary code prior to decoding rather than attempt to modify the decoder.

A device to convert from Gray code to the normal binary code must be capable of examining the individual code digits, starting with the most significant digit, and changing them in accordance with the following rules. The most significant digit (the first digit) is the same in both codes. As to subsequent digits, if the sign of the previous normal code digit is positive, then the next normal binary code digit is the same as the corresponding Gray code digit. If, however, the previous code digit (which has been converted from Gray to normal binary code) is negative (as, for example, in a plus-minus binary code system) or is a space (as, for example, in an on-off binary system), then the Gray code digit is changed in order to obtain the proper normal binary code digit. Thus, for example, if the Gray code is 10101 (or $+1-1+1-1+1$), the corresponding normal binary code derived by applying the rules is 10011 (or in the plus-minus system $+1-1-1+1+1$). If the Gray code is 00101 ($-1-1+1-1+1$), the normal binary code is given by 01100 ($-1+1+1-1-1$).

The conversion from Gray to normal binary code may be done immediately prior to transmission, after transmission at the receiving station prior to decoding or it can be accomplished directly in the discriminator stage of each of the code digit generators making up the encoder described in FIGS. 1 and 4. An arrangement for doing this, given by way of example, is shown in FIG. 8 which illustrates a typical frequency discriminator modified to generate the normal binary code directly.

Figure 8:
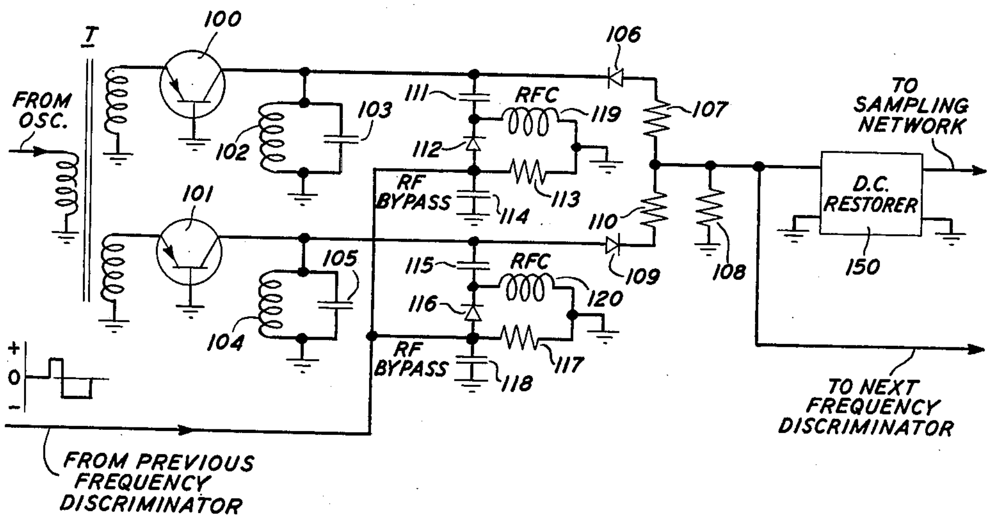
FIG. 8 shows schematically a frequency discriminator modified to convert Gray code to normal binary code.

The discriminator-code converter shown in FIG. 8 comprises a pair of transistors 100 and 101 connected in the common base configuration with the emitter of each transistor connected to a separate secondary winding of transformer T. The primary of transformer T is connected to the oscillator of the code digit generator sensing circuit.

The collector of transistor 100 is connected to a first tuned circuit comprising inductor 102 and capacitor 103 and to a first diode 106 which is, in turn, connected to the common output load resistor 108 through the series resistor 107.

The collector of transistor 101 is similarly connected to a second tuned circuit comprising inductor 104 and capacitor 105 and to a second, oppositely poled, diode 109 which also connects to the common load resistor 108 through a series resistor 110.

The remaining portion of each collector circuit relates to the modifications of the discriminator circuit to generate the normal binary code and will be discussed hereinafter.

Figure 8A:
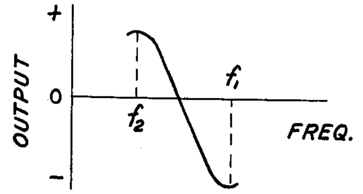
FIGS. 8A and 8B show the output characteristics of the frequency discriminator-code converter shown in FIG. 7.

When operating as a simple frequency discriminator in a Gray code encoder (such as discriminator 51 in FIG. 4) or as the discriminator in the first code digit generator in a normal binary code encoder, the two collector circuits are tuned to different frequencies. In particular, if the frequency excursions of the oscillator in the sensing circuit extend between frequencies $f_1$ and $f_2$, one of the tuned circuits is tuned to frequency $f_1$ and the other to frequency $f_2$. The output characteristic of the discriminator when so adjusted is as shown in FIG. 8A. Thus, as the oscillator frequency deviates between frequencies $f_1$ and $f_2$, the output from the discriminator changes from a minus value to a plus value. (For purposes of illustration in FIG. 4 the direct current reference level of the discriminator was shifted to produce changes between zero and plus). Accordingly, as the instantaneous oscillator frequency changes in accordance with the polarity of the signal waveform being encoded, the polarity of the output from the frequency discriminator also changes. The code thus generated is in the Gray code.

To generate the normal binary code, a converter network comprising an additional tuned element is provided in each collector circuit in the form of a shunt capacitor. For transistor 100 the shunt capacitor 111 is returned to ground through a diode 112 and an R.-F. bypass capacitor 114. Also included in this network is a resistor 113 and an R.-F. choke 119 which form a conductively continuous path for diode 112. Similarly, in the collector circuit of transistor 101 the additional shunt tuned capacitor 115 is returned to ground through a diode 116 and the R.-F. bypass capacitor 118. The direct current path for diode 116 includes resistor 117 and the R.-F. choke 120. The discriminator circuit is further modified in that the two original tuned circuits comprising inductor 102 and capacitor 103 and inductor 104 and capacitor 105 are both tuned to the same frequency, i.e., the upper frequency $f_1$. In the absence of any external signal diodes 112 and 116 are non-conducting and appear as a large impedance in series with capacitors 111 and 115, respectively, and the effect of these capacitors upon the tuning of the collector circuits is substantially nil. If, however, a positive pulse is applied at the common junction of the diodes and their associated R.-F. bypass capacitors, diode 116 will be forward biased and driven into its low impedance conducting region. Capacitor 115 will then be essentially grounded through diode 116 and R.-F. bypass capacitor 118 and will shift the resonant frequency of the collector circuit of transistor 101 from frequency $f_1$ to a lower frequency $f_2$. Because diode 112 is oppositely poled with respect to diode 116, it will remain in a high impedance non-conducting state and the resonant frequency of the collector circuit of transistor 100 will remain at frequency $f_1$. The discriminator will then have an output characteristic of the type characterized in FIG. 8A.

Figure 8B:
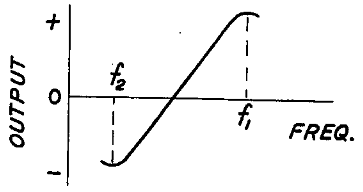

If, however, a negative pulse is applied to the converter network, diode 116 remains cut off whereas diode 112 is driven into conduction. The effect is to reduce the frequency of the collector circuit of transistor 100 from $f_1$ to $f_2$ while the frequency of the collector circuit of transistor 101 remains at $f_1$. Because diodes 106 and 109 are oppositely poled, as indicated, the result is to modify the output characteristic of the discriminator to that shown in FIG. 8B. Thus, whereas a signal at frequency $f_1$ would heretofore produce a negative pulse, a signal at frequency $f_1$ now produces a positive pulse. If diodes 112 and 116 are activated by pulses derived from the previous digit discriminator, as indicated in FIG. 8, the polarity of the voltage developed across load resistor 108 will be controlled both by the frequency of the sensing circuit oscillator and by the output from the previous digit discriminator. In particular, if that output from the previous digit discriminator is negative the output across load resistor 108 will be changed from what it would be in a Gray code encoder. This, however, is in accordance with the rules outlined above for converting from Gray to normal binary code.

The encoder described in FIGS. 1 and 4 utilizes an on-off binary code. The output obtained from load resistor 108 is in the plus-minus binary system. The insertion of a direct current restorer 150 between the discriminator and the sampling network will convert from the plus-minus system to the on-off system if this is desired.

In all cases it is understood that the above-described arrangements are simply illustrative of a small number of the many possible specific embodiments which represent applications of the principles of the invention. Thus, the use of transistors is not intended to limit the invention to such devices. Obviously other active elements such as vacuum tubes may be used. Similarly, the circuits described in detail are only intended to be illustrative and other circuit configurations to accomplish the desired functions may be used. Thus, numerous and varied other arrangements can readily be devised in accordance with these principles by those skilled in the art without departing from the spirit and scope of the invention.

What is claimed is:

1. Means for representing the amplitude of a waveform as a time sequence of binary code digits comprising a plurality of cascaded full wave rectifiers equal in number to the number of code digits in said sequence of digits, each of said rectifiers having an input and an output, means for applying said waveform to the input of the first of said rectifiers, means for coupling rectified signal from the output of each of said rectifiers to the input of the next successive rectifier, said coupling means establishing a new zero level for each of said rectified signals, sampling means for determining the instantaneous polarity of the signal applied to each rectifier, means for gating said sampling means at a given rate to produce a plurality of code digits, and means for sequentially combining said digits.

2. The combination according to claim 1 wherein said waveform has an amplitude less than a given maximum, I, and greater than a given minimum, —I.

3. The combination according to claim 2 wherein the zero reference level established by the $m^{th}$ coupling means is $$\frac{IG}{2^m}$$

where G is the total net gain in the circuit up to the $m^{th}$ coupling means.

4. The combination according to claim 2 wherein said coupling means comprises a pair of transistors arranged in a push-pull configuration and means for biasing said transistors wherein the difference between the bias current in the two transistors for the $m^{th}$ coupling means is given by $$\frac{IG}{2^{(m-1)}}$$

where G is the total net gain in the circuit up to the $m^{th}$ coupling means.

5. An encoder for representing the instantaneous amplitude of a waveform as a time sequence of binary code digits comprising a plurality of cascaded code digit generators equal in number to the number of code digits in said sequence of code digits, each of said generators comprising a full wave rectifier for controlling the instantaneous frequency of a variable frequency oscillator, means for detecting the instantaneous frequency of said oscillator, and means for sampling the output of said detector at a given rate to produce a time varying array of pulses representing one of the code digits in said sequence of digits.

6. The combination according to claim 5 wherein said full wave rectifier includes four asymmetrically conducting devices connected in a bridge configuration and wherein one of said devices is an element in the resonant circuit of said variable frequency oscillator.

7. The combination according to claim 6 wherein said devices exhibit a low impedance when biased in one direction and a high impedance when biased in the reversed direction and wherein the frequency of said oscillator varies as a function of the impedance of said one device.

8. The combination according to claim 5 wherein said detecting means converts variation in the instantaneous frequency of said oscillator into variations in amplitude.

9. The combination according to claim 8 wherein said oscillator operates substantially at either of two distinctly different frequencies and wherein the output from said detecting means varies between a given positive and a given negative value.

10. A frequency detector-code converter comprising first and second resonantly tuned circuits, means for coupling said circuits to a common source of wave energy, means for coupling said circuits to a common load, said circuits being tuned to substantially the same resonant frequency, means for varying the resonant frequency of said first circuit comprising a first reactive circuit element connected in parallel therewith through a first rectifying means, means for varying the resonant frequency of said second circuit comprising a second reactive circuit element connected in parallel therewith through a second rectifying means, said first rectifying means being poled to conduct in response to positive going control signals, said second rectifying means being poled to conduct in response to negative going control signals, and means for applying control signals to both of said rectifying means.

11. An encoder for representing the instantaneous amplitude of a waveform as a time sequence of binary code digits comprising a plurality of cascaded code digit generators equal in number to the number of code digits in said sequence of code digits, each of said generators comprising a full wave rectifier for controlling the instantaneous frequency of a variable frequency oscillator and a frequency detector for translating frequency variations produced by said oscillator into amplitude variations, the detector in the first of said code digit generators being responsive solely to the frequency of the variable frequency oscillator in said first code digit generator, means for modifying the amplitude variations produced by the detectors in the other of said code digit generators as a function of the amplitude variations produced in the detector in the adjacent preceding code digit generator, and means for sampling the amplitude variations of all of said detectors at a given rate to produce a time varying array of pulses representing the code digits in said sequence of digits.

12. The combination according to claim 11 wherein the amplitude variations of said detectors vary between a given positive and a given negative value and wherein the amplitude variations of said other detectors are reversed in polarity when the instantaneous amplitude of the detector of the preceding code digit generator is negative.

13. Means for representing the amplitude of a waveform as a time sequence of binary code digits comprising a plurality of cascaded full wave rectifiers equal in number to the number of code digits in said sequence of digits, each of said rectifiers having an input and an output, means for sampling said waveform at a given rate and for holding the instantaneous amplitude of said sampled waveform until the next sampling period, said sampling means having a substantially constant output between sampling periods proportional to said instantaneous amplitude, means for applying said sampled waveform to the input of the first of said rectifiers, means for coupling rectified signal between successive rectifiers, said coupling means establishing a new zero level for each of said rectified signals, sensing means for determining the instantaneous polarity of the rectified signal applied to each rectifier, and means for sequentially combining said digits.

14. The combination according to claim 13 wherein the output from said sensing means has one polarity when said waveform is positive and an opposite polarity when said waveform is negative.

15. The combination according to claim 13 wherein said gating means comprises a pulse generator having a repetition rate equal to twice the bandwidth of said waveform, a coincidence network for transmitting portions of the output from said sensing means at intervals controlled by said pulse generator, and a delay line for coupling said pulse generator to said coincidence networks.

No references cited.